US007880723B2

(12) United States Patent
Lu (10) Patent No.: US 7,880,723 B2
(45) Date of Patent: Feb. 1, 2011

(54) OPTICAL IMAGE DETECTING STRUCTURE WITH MULTIPLE FUNCTION

(75) Inventor: Shu-Feng Lu, Taipei (TW)

(73) Assignee: Pacing Technology Co., Ltd., Taipei (TW)

( * ) Notice: Subject to any disclaimer, the term of this patent is extended or adjusted under 35 U.S.C. 154(b) by 686 days.

(21) Appl. No.: 11/936,330

(22) Filed: Nov. 7, 2007

(65) Prior Publication Data
US 2009/0115728 A1 May 7, 2009

(51) Int. Cl.
G06F 3/033 (2006.01)
(52) U.S. Cl. .................... 345/166; 345/167; 359/15
(58) Field of Classification Search ......... 345/156–168; 359/9, 15, 22, 29
See application file for complete search history.

(56) References Cited
U.S. PATENT DOCUMENTS

| 7,439,952 | B2 * | 10/2008 | Selby et al. ............... 345/157 |
| 7,595,478 | B2 * | 9/2009 | Zhang ..................... 250/221 |
| 2004/0246233 | A1 * | 12/2004 | Chang et al. .............. 345/166 |
| 2005/0231482 | A1 * | 10/2005 | Theytaz et al. ............ 345/166 |
| 2005/0248535 | A1 * | 11/2005 | Sawyer .................... 345/167 |
| 2006/0290675 | A1 * | 12/2006 | Bricaud et al. ............ 345/167 |
| 2007/0091069 | A1 * | 4/2007 | Yang ....................... 345/167 |
| 2008/0084617 | A1 * | 4/2008 | Ho ......................... 359/726 |
| 2008/0204415 | A1 * | 8/2008 | Jung et al. ................ 345/166 |
| 2008/0284735 | A1 * | 11/2008 | Shim ....................... 345/166 |

FOREIGN PATENT DOCUMENTS
TW M258357 3/2005

* cited by examiner

Primary Examiner—Kimnhung Nguyen
(74) Attorney, Agent, or Firm—Rosenberg, Klein & Lee (57) ABSTRACT

A multiple function optical image detecting structure includes a shell body, a tracing ball, an optical base, a circuit board, a light-emitting element, and an image sensor. The shell body receives the tracing ball. The optical base has a slanted spectroscope that faces part of the spherical surface of the tracing ball and a lens element located on one side of the spectroscope. The light-emitting element and the image sensor are electrically connected with the circuit board. The light-emitting element faces towards the spectroscope and the image sensor faces towards the lens element. The light axial of the projected light generated from the light-emitting element is reflected/transmitted to the surface of the tracing ball via the spectroscope. Thereby, the light is uniformly projected on the tracing ball and the image sensor obtains the image on the lens element to calculate a displacement.

9 Claims, 11 Drawing Sheets

OPTICAL IMAGE DETECTING STRUCTURE WITH MULTIPLE FUNCTION

BACKGROUND OF THE INVENTION

1. Field of the Invention

The present invention relates to an optical image detecting structure with multiple functions. In particular, this invention relates to a multiple function optical image detecting structure that obtains the moving distance and direction of a tracing ball to calculate its displacement.

2. Description of the Related Art

Figure 1:
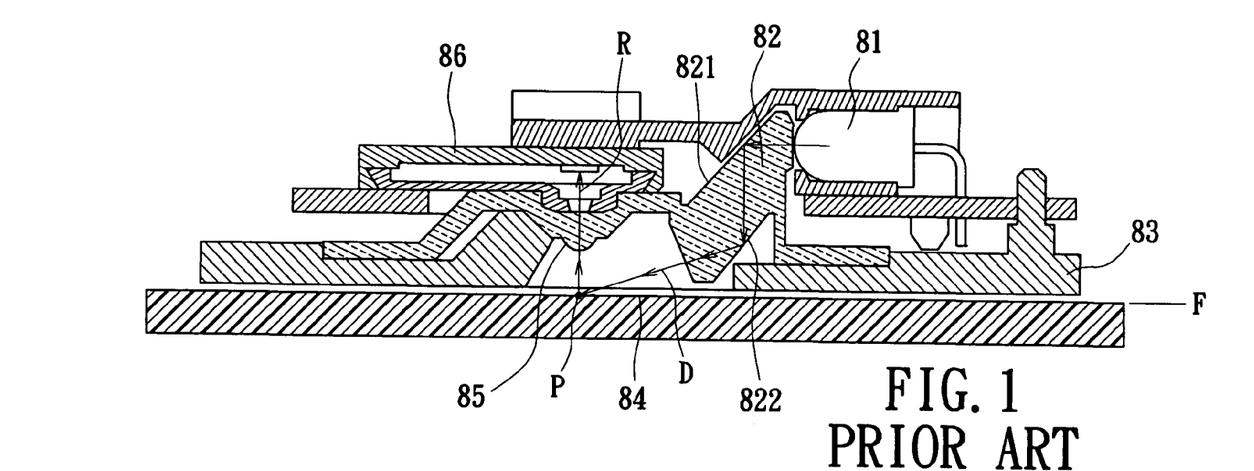
FIG. 1 is a cross-sectional view of the optical mouse of the prior art.

Desktop personal computers or laptops usually use a mouse or a tracing ball device to control the cursor to move on the screen. An optical mouse is a common and popular such mouse. FIG. 1 shows a cross-sectional view of an optical mouse of the prior art. The optical mouse moves on a plate surface. The light-emitting element 81 emits light to a first reflection surface 821 of a light-guiding board 82 and the light is reflected to a second reflection surface 822. Next, the light is reflected by the second reflection surface 822, passes through the opening of the bottom shell 83, is projected onto a contacting surface 84 formed by a non-transparent medium, and is overlapped to an image axial F. The image on the image axial F is focused by a lens 85. Thereby, an image sensor 86 obtains the image on the image axial F formed by the light of the contacting surface 84. The image sensor can continuously obtain the exact image, and a circuit control unit (not shown in the figure) can calculate the moving distance and direction of the optical mouse and control the cursor to move on the screen.

The light axial D of the projecting light and the light axial R of the obtaining image have to form a crossed point P on the image axial F of the contacting surface 84 for the image-obtaining method of the optical mouse of the prior art. Thereby, the image sensor 86 can exactly obtain the image signal on the image axial F.

Figure 2:
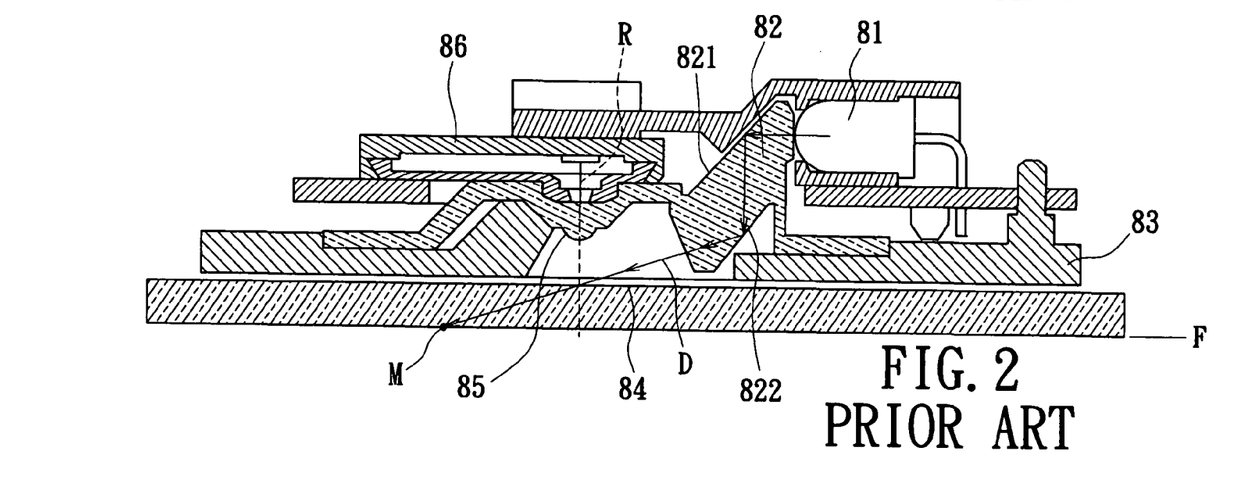
FIG. 2 is another cross-sectional view of the optical mouse of the prior art.

As shown in FIG. 2, the functions of the optical mouse are limited due to the type of the contacting surface 84, for example, the contacting surface 84 is made of a transparent material (such as a glass), or a material that can absorb/disturb light (such as a lacquered metal or a lens). When the contacting surface 84 is made of a transparent material, the contacting surface 84 does not overlap with the image axial F. When a light is projected onto the contacting surface 84 and the reflective index is not calculated, the light axial D of the projected light and the image axial F form a crossed point M. This means that the light axial D of the projected light and the light axial R of the obtaining image don't form a crossed point on the image axial F. Thereby, the function of the optical mouse fails. In other words, due to the type of the contacting surface 84, the function of the optical mouse is limited or fails.

The tracing ball device can be installed in the shell of the keyboard or the laptop, or is connected with the computer host by a USB connector. Next, the user uses his or her fingers to rotate the tracing ball to control the cursor to move on the screen.

Figure 3:
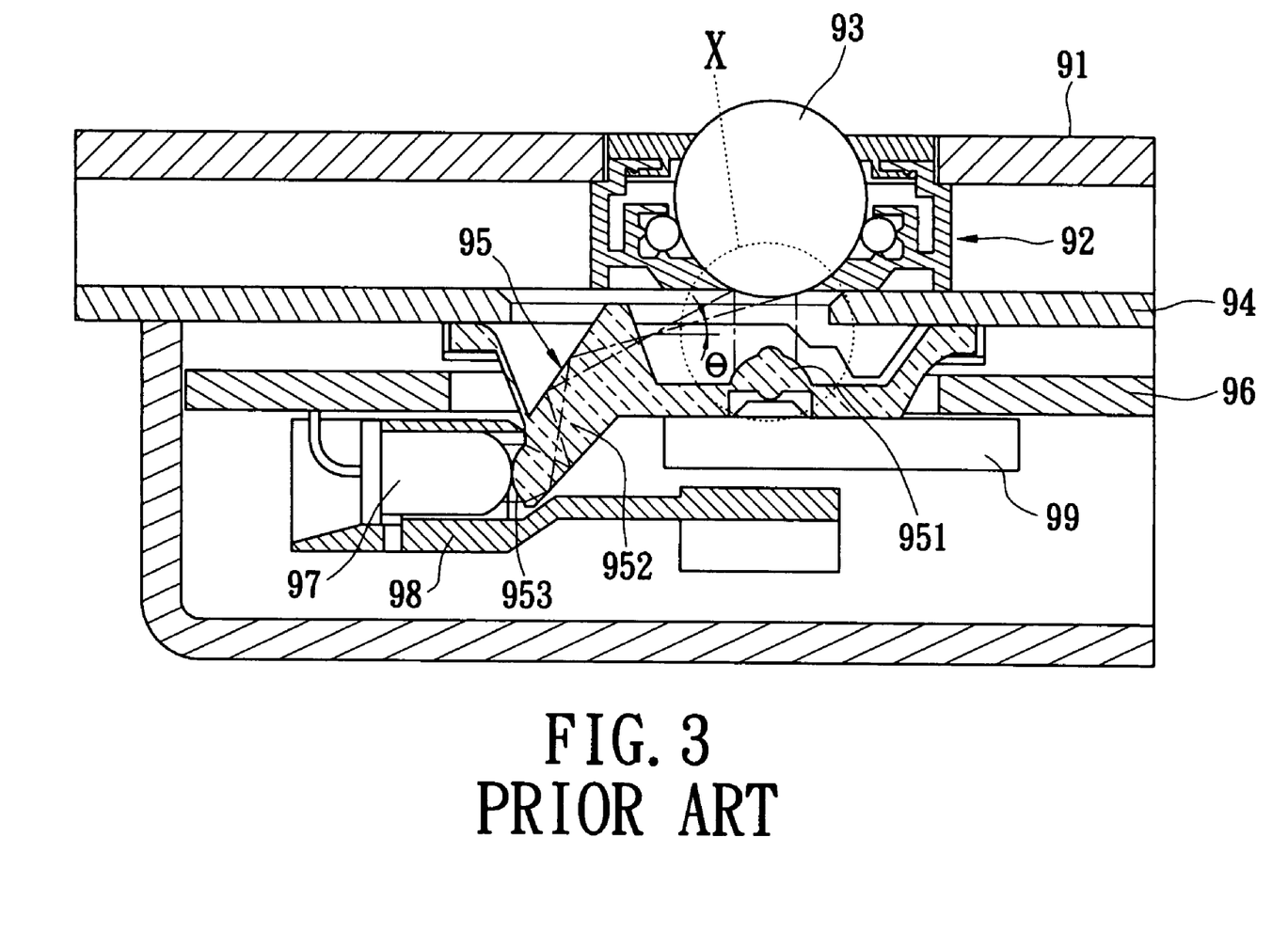
FIG. 3 is a cross-sectional view of the optical tracing ball structure of the prior art.
Figure 3A:
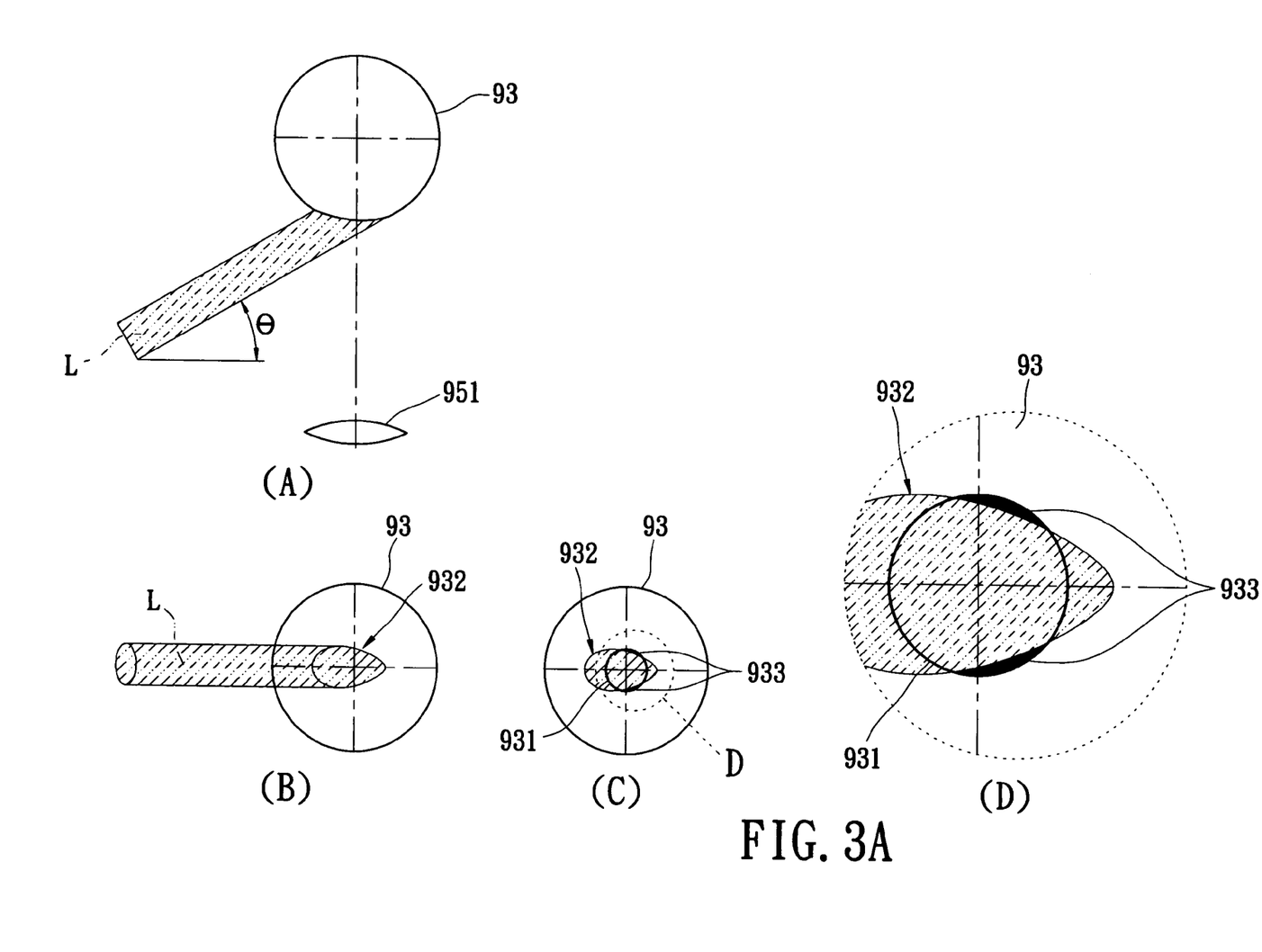
FIG. 3A is a schematic diagram of the light projection of part X in FIG. 3.
Figure 3B:
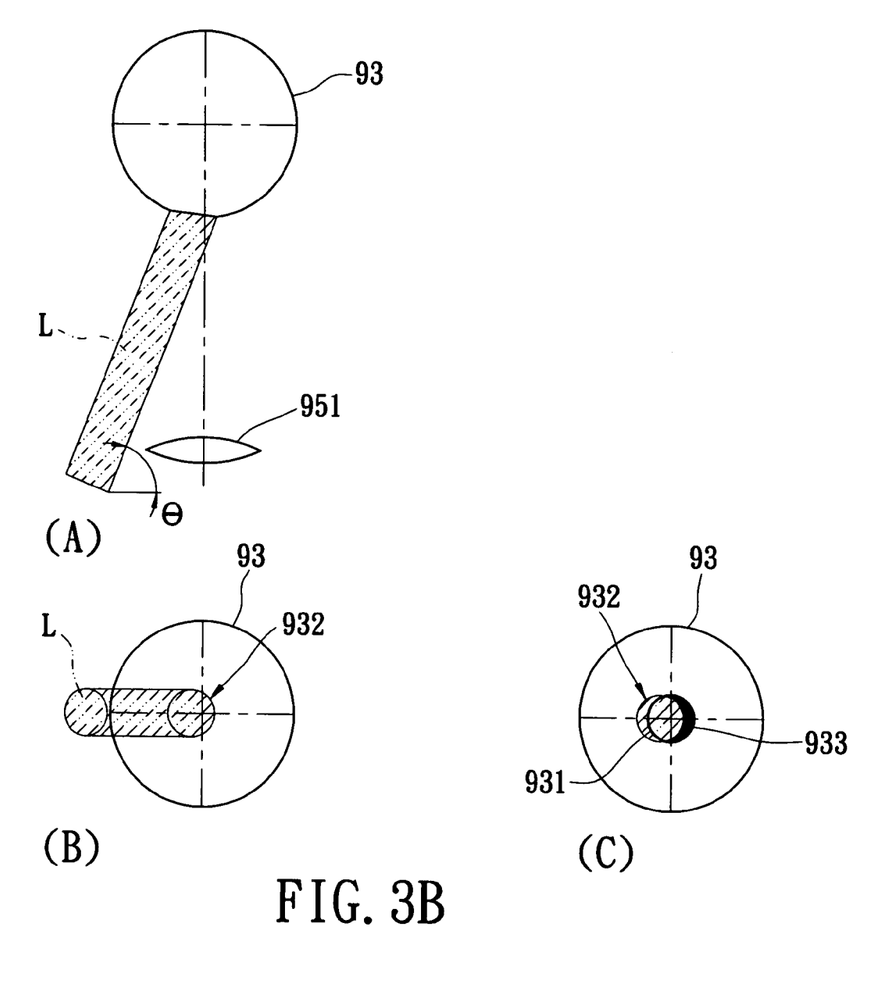
FIG. 3B is another schematic diagram of the light projection of part X in FIG. 3.

The tracing ball device of the prior art is an optical type of tracing ball. Taiwan patent M258357, published on 1 Mar. 2005, discloses an optical tracing ball structure, as shown in FIG. 3. From the top surface towards the bottom surface of the shell 91, a base 92, a tracing ball 93, a light-passing board 94, an optical base 95, a circuit board 96, a light-emitting element 97, a light mask 98, and an identifying element 99 are located in the shell 92. The optical base 95 includes a lens 951, a reflection portion 952, and a light-guiding lens 953.

When the light generated from the light-emitting element 97 is projected onto the light-guiding lens 953 of the optical base 95, the light is reflected by the reflection portion 952 and is slantedly projected onto the bottom spherical surface of the tracing ball 93 (having a projection angle θ). The identifying element 99 detects the moving distance and direction of the tracing ball 93 via the lens 951. When the tracing ball 93 is rotated, the identifying element 99 detects the moving distance and direction of the tracing ball 93 and a displacement is calculated. The calculated displacement is transmitted to a host. Thereby, the host controls the cursor to move on the screen by referring the displacement.

Actually, after the light of the light-emitting element 97 is reflected by the reflection portion 952 and is projected onto the bottom spherical surface of the tracing ball 93, an image-obtaining area 931 is generated on the spherical surface. Reference is made to (A) and (C) of FIG. 3. The identifying element 99 obtains the image projected on the image-obtaining area 931 via the lens 951. The preexisting condition for the identifying element 99 to obtain the image is that the light has to be uniformly projected onto the spherical surface of the tracing ball 9 (this means that the light on the image-obtaining area 931 has to be uniform). Thereby, the identifying element 99 can obtain a complete image, and determine the moving distance and direction of the tracing ball 93 so that a displacement is calculated. Therefore, the cursor can be exactly controlled to move on the screen.

However, when the light of the light-emitting element 97 forms a light beam L that is emitted to the spherical surface of the tracing ball 9, a light-projecting area 932 is generated, as shown in (A), (B) and (C) of FIG. 3. Due to the inclined projection angle θ, the light-projecting area 932 and the image-obtaining area 931 cannot uniformly/overlap. Therefore, a shaded area 933 is generated on the image-obtaining area 931, as shown in (C) and (D) of FIG. 3. The identifying element 99 cannot obtain complete image to determine the moving distance and direction of the tracing ball 93 and calculate a displacement. (Part (D) is an enlarged figure of part D in Part (C) in FIG. 3.)

Reference is made to (A) and (B) of FIG. 3. When the projection angle θ becomes larger, the shaded/shading area 933 also becomes larger. As shown in (C) of FIG. 3, the shaded area 933 in the image-obtaining area 931 is (so) large that the complete displacement cannot be obtained. Therefore, the tracing ball device cannot obtain the exact displacement.

SUMMARY OF THE INVENTION

One particular aspect of the present invention is to provide a multiple function optical image detecting structure. A uniform obtained-image is generated. An image sensor can obtain the complete image to determine the moving distance and direction of the tracing ball and calculate an exact displacement.

The multiple function optical image detecting structure includes a shell body having a receiving space and a through hole that links through the receiving space, a tracing ball rotatably positioned in the receiving space of the shell body, an optical base located on one side of the through hole, a circuit board located on one side of the optical base, a light-emitting element electrically connected with the circuit board, and an image sensor electrically connected with the circuit board. Part of the spherical surface of the tracing ball extends outside of the shell body, and another part of the spherical surface of the tracing ball corresponds to the through hole. The optical base has an inclined spectroscope, and a lens element located on one side of the spectroscope. The spectroscope slantedly faces towards the through hole. The light axial of the projected light generated from the light-emitting element faces towards the spectroscope of the optical base. The light axial of the projected light that has been reflected/transmitted by the spectroscope one time or more than one time is located on part of the spherical surface of the tracing ball. The spherical surface image of the tracing ball is reflected to the spectroscope. The light axial of the obtaining-image and the light axial of the light projected by the spectroscope overlap. The image sensor faces towards the lens element. The light axial of the obtaining-image is projected onto the lens element by the spectroscope. Thereby, the image sensor obtains the image on the lens element to determine the moving distance and direction of the tracing ball and calculate an exact displacement.

The present invention has the following characteristics. The light axial of the projected light generated from the light-emitting element is reflected/transmitted by the spectroscope one time or more than one time so as to be projected on the spherical surface of the tracing ball (the image-obtaining area). Thereby, the light can be uniformly projected onto the image-obtaining area. Because the light axial of the projected light and the light axial of the obtaining-image overlap, and the light is projected onto the spectroscope, and projected onto the lens element again, a uniform obtaining-image is generated. The image sensor can obtain the complete image to determine the moving distance and direction of the tracing ball and calculate an exact displacement.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 4:
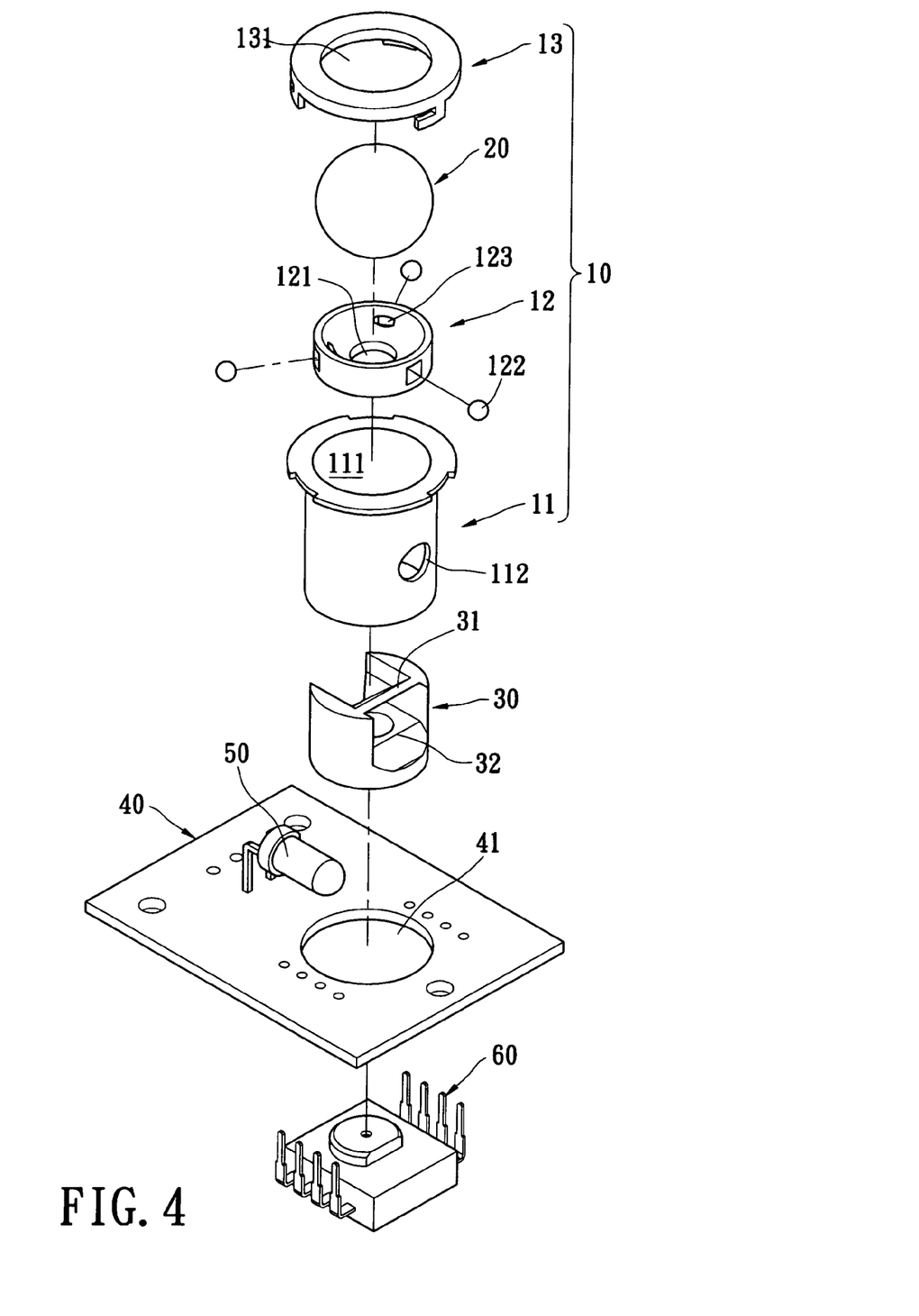
FIG. 4 is an exploded perspective view of the present invention.
Figure 5:
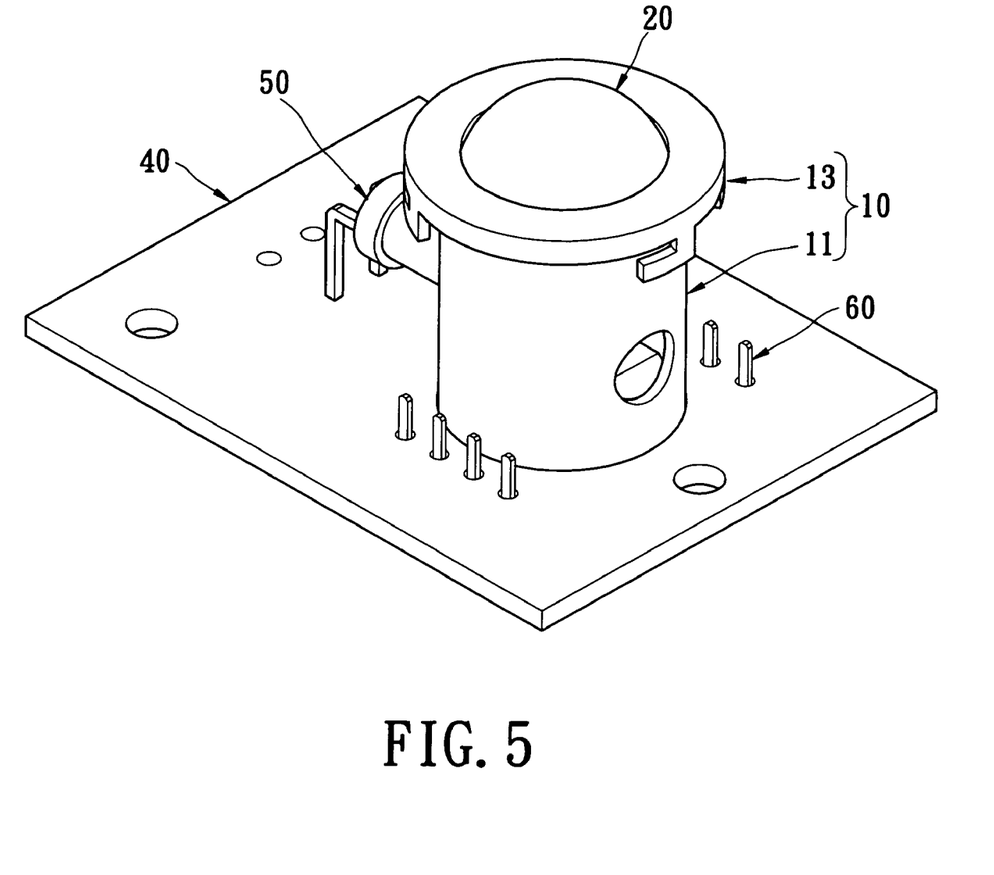
FIG. 5 is an assembly perspective view of the present invention.
Figure 6:
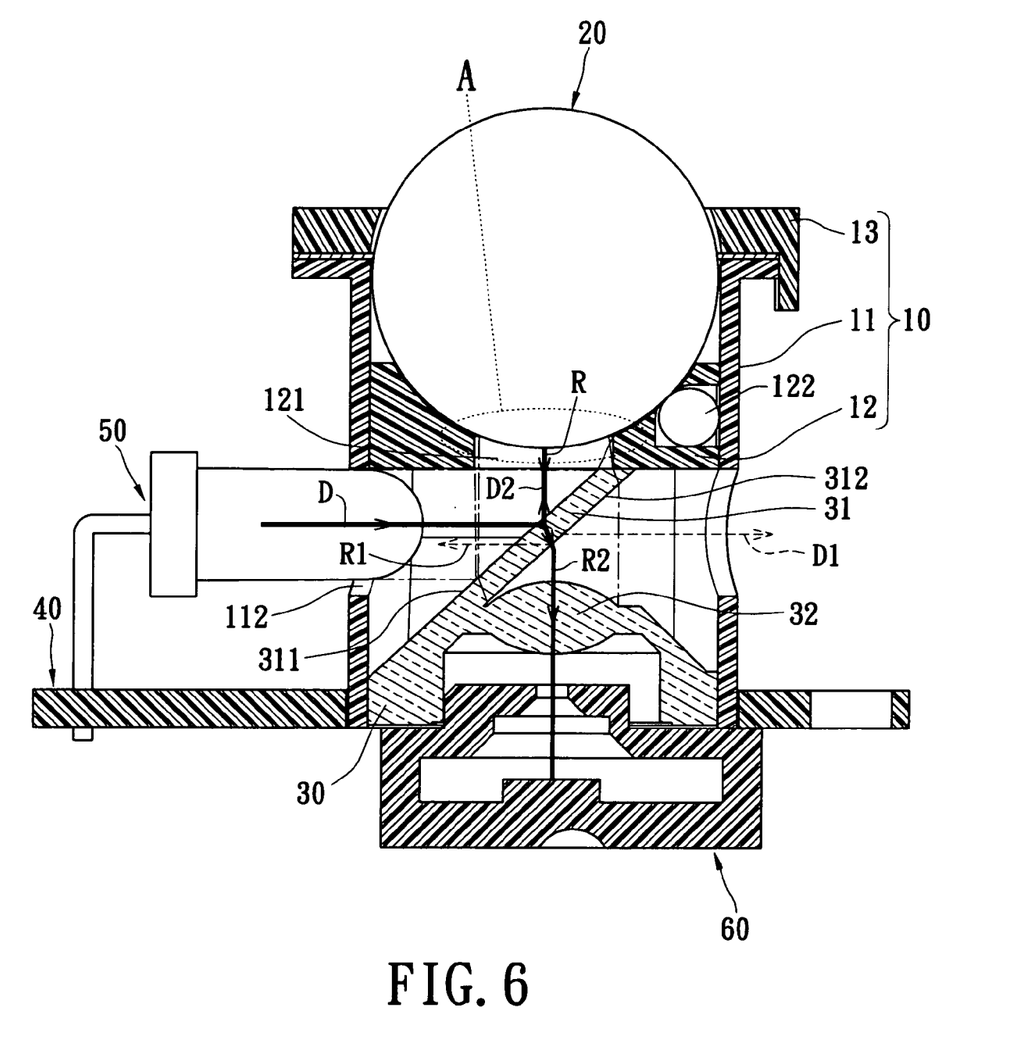
FIG. 6 is a cross-sectional view of the present invention.

Reference is made to FIGS. 4~6. The multiple function optical image detecting structure includes a shell body 10, a tracing ball 20, an optical base 30, a circuit board 40, a light-emitting element 50, and an image sensor 60.

The shell body 10 is used for receiving the tracing ball 20. The shell body 10 includes an external shell 11, a supporting base 12, and a fastening cover 13. There is a receiving space 111 from the top to the bottom of the external shell 11, and there are two opposite holes 112 on the side surfaces of the external shell 11. At the center of the supporting base 12, there is a through hole 121. There is a plurality of rotating balls 122 in the interior of the supporting base 12. The supporting base 12 has a plurality of openings 123 so that part of rotating ball 122 is exposed outside of the supporting base 12. The fastening cover 13 has an opening hole 131.

The optical base 30 has an inclined spectroscope 31, and a lens element 32 horizontally located on one side of the spectroscope 31. The spectroscope 31 has an external surface 311 and an inner surface 312. The lens element 32 extends from the inner surface 31 (as shown in FIG. 4).

The circuit board 40 has an opening 41. The light-emitting element 50 is electrically connected with one end of the circuit board, 40. The image sensor 60 is electrically connected with the second end of the circuit board 40 that is opposite to the light-emitting element 50. Part of the image sensor 60 passes through or is located on the opening 41 of the circuit board 40.

When the multiple function optical image detecting structure is assembled, the optical base 30 is installed above the image sensor 40 so that the image sensor 60 faces towards the lens element 32. Next, the external shell 11 is sleeved to the optical base 30 along a direction that is vertical to the circuit board 40 so that the optical base 30 is located in the receiving space 111. At the same time, part of the front end of the light-emitting element 50 extends to one of the holes 112 to face towards the spectroscope 31 of the optical base 30. Next, the supporting base 12 is installed in the receiving space 111 of the external shell 11 and is positioned above the optical base 30. At the same time, the spectroscope 31 slantedly faces towards the through hole 121 of the supporting base 12, and the through hole 121 links through the receiving space 111.

Continuously, the tracing ball 20 is installed in the receiving space 111 of the external shell 11 and part of the tracing ball 20 contacts the rotating balls 122 so that the tracing ball 20 is rotatably positioned in the shell body 10. The lower spherical surface of the tracing ball 20 corresponds to the through hole 121 and extends outside of the through hole 121 or is located in the through hole 121 to face towards the spectroscope 31. The external surface 311 of the spectroscope 31 slantedly faces the through hole 121 and the lens element 32 is located at a position that is far away from the tracing ball 20 so that the tracing ball 20, the spectroscope 31, the lens element 32, and the image sensor 60 are all disposed facing in the same direction (a vertical type). Finally, the fastening cover 13 is combined with the external shell 11 so that the tracing ball 20 passes through the opening hole 141 and the upper spherical surface extends outside of the fastening cover 13 of the shell body 10.

The above structure can be implemented in different ways. For example, the supporting base 12 and the external shell 11 are integrated into one piece so that the supporting base 12 is combined with the receiving space 111 of the external shell 11. Furthermore, the optical base 30 and the external shell 11 are integrated into one piece so that the optical base 30 is combined with the receiving space 111 of the external shell 11. However, in order to simplify the assembling process, when the external shell 11 and the supporting base 12 are integrated into one piece, the optical base 30 can be implemented by an assembling method. Alternatively, when the external shell 11 and the optical base 30 are integrated into one piece, the supporting base 12 can be implemented by an assembling method.

Figure 6A:
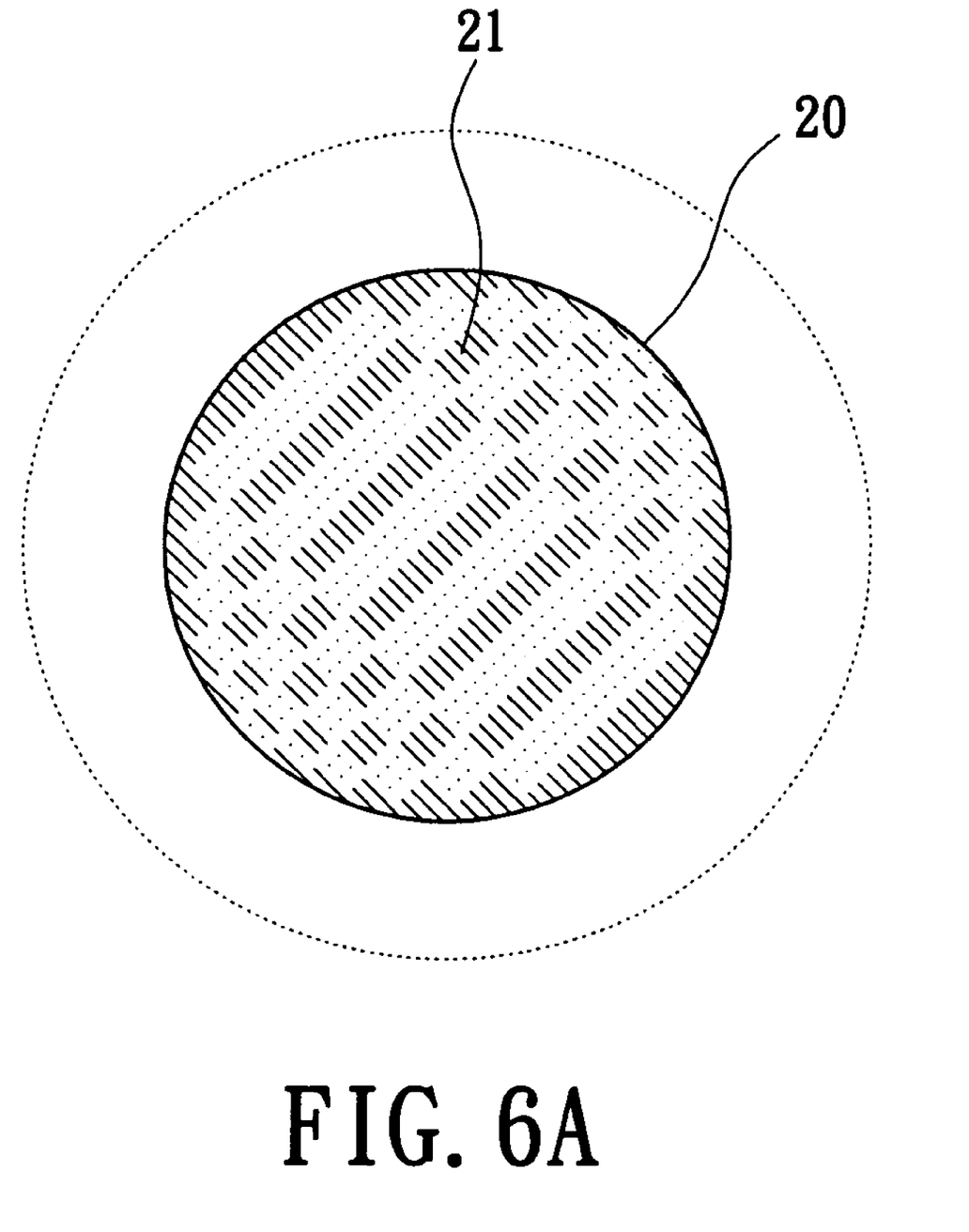
FIG. 6A is a detailed diagram of part A in FIG. 6.

Reference is made to FIGS. 6 and 6A. When the light axial D of the projected light generated from the light-emitting element 50 faces and emits towards the spectroscope 31, part of the projected light is reflected by the spectroscope 31 and part of the projected light passes through the optical object. The light axial D1 of the passed light passes through another hole 112, and the light axial D2 of the reflected light faces towards the through hole 121 and is projected onto the spherical surface of the tracing ball 20 (the image-obtaining area 21, as shown in FIG. 6A). The spherical surface image of the tracing ball 20 is reflected to the external surface 311 of the spectroscope 31, and the light axial R of the obtaining-image and the light axial D2 of the light projected by the spectroscope 31 overlap.

By using the spectroscope 31, the light axial R1 of the reflected obtaining-image is projected onto the light-emitting element 50, and the light axial R2 of the passed obtaining-image is projected onto the lens element 32 so that the image sensor 60 obtains the image. When the tracing ball 20 is rotating, the image sensor 60 obtains the moving distance and direction of the tracing ball 20 to calculate a displacement.

The light axial D of the projected light generated from the light-emitting element 50 is reflected by the spectroscope 31 one time or more than one time to make the light axial D2 of the reflected light be located in the image-obtaining area 21 of the tracing ball 20 in a vertical direction. Thereby, the light beam is uniformly projected onto the image-obtaining area 21 (the projection area of the light beam and the image-obtaining area 21 are overlapped.) Because the light axial D2 of the projected light and the light axial R of the obtaining-image are overlapped, are projected onto the spectroscope 31, and are projected onto the lens element 32 the uniform obtaining-image is generated. Thereby, the image sensor 60 can obtain the complete image to determine the moving distance and direction of the tracing ball 20 and calculate a displacement.

Figure 7:
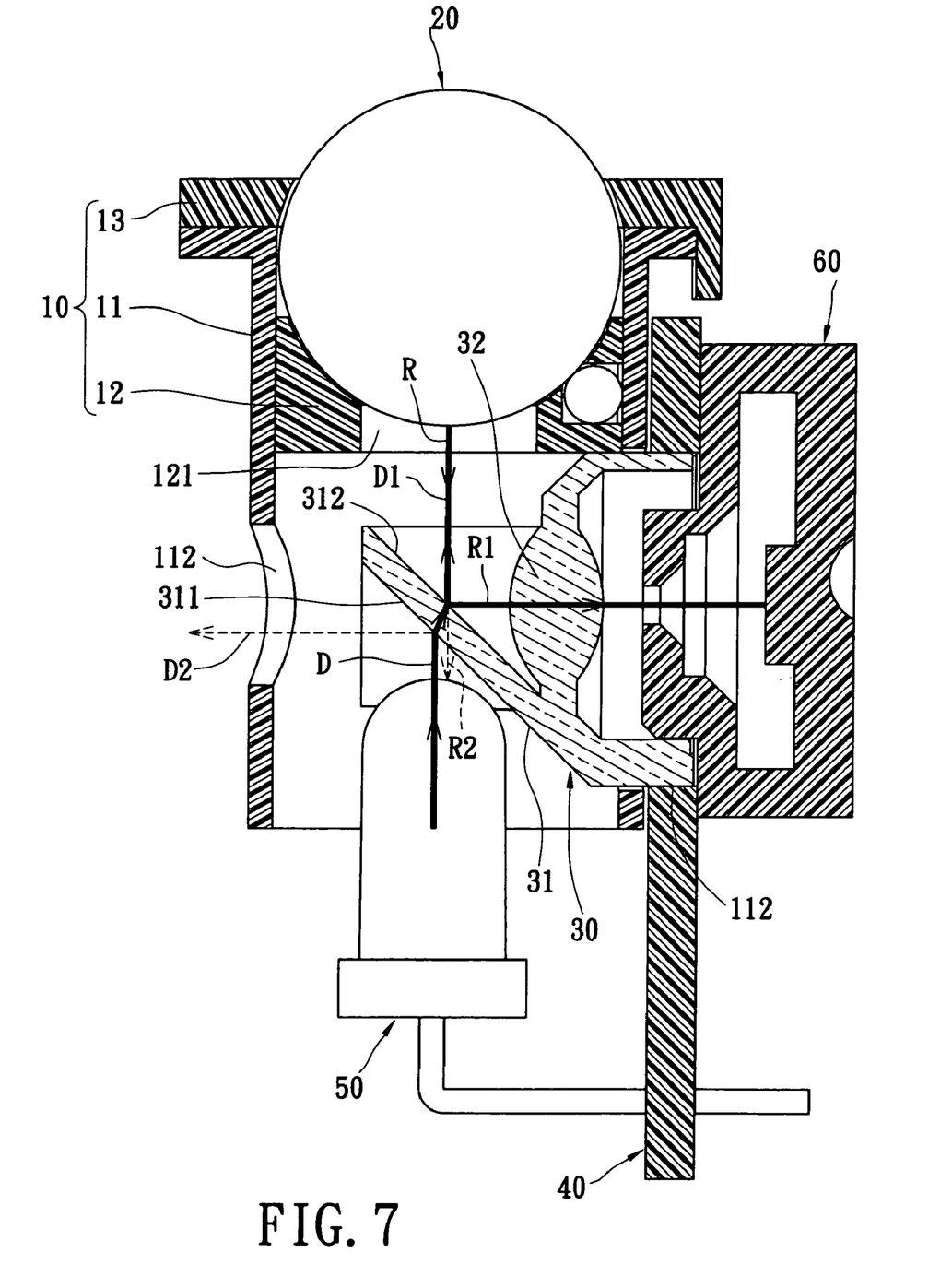
FIG. 7 is a cross-sectional view of the second embodiment of the present invention.

Reference is made to FIGS. 7 and 6A. By utilizing the characteristics of the spectroscope 31, the design of the structure of the present invention can be implemented in different ways. For example, the external shell 11 is located on the circuit board 40 along the direction that is parallel to the circuit board 40 so that the optical base 30 passes through the hole 112 and is located in the receiving space 111. The light-emitting element 50 directly extends into the receiving space 111 and the spectroscope 31 slantedly faces towards the through hole 121. The inner surface 312 of the spectroscope 31 slantedly faces towards the through hole 121 and the tracing ball 20, and the external surface 311 faces towards the light-emitting element 50 so that the lens element 32 is located in a direction that faces towards the tracing ball 20. Thereby, the tracing ball 20, the spectroscope 31 and the light-emitting element 50 are installed in the same direction (a horizontal type).

When the light axial D of the projected light generated from the light-emitting element 50 emits towards the spectroscope 31, the light axial D of part of the projected light that passes through the spectroscope 31 faces towards the through hole 121 and is projected onto the spherical surface of the tracing ball 20. The light axial D2 of part of the projected light that is reflected by the spectroscope 31 faces towards the hole 112 and the spherical surface image of the tracing ball 20 is reflected to the inner surface 312 of the spectroscope 31. The light axial R of the obtaining-image and the light axial D1 of the light passing through the spectroscope 31 are overlapped.

By using the spectroscope 31, the light axial R1 of the reflected obtaining-image is projected onto the lens element 32 so that the image sensor 60 obtains the image, and the light axial R2 of the passing obtaining-image is projected onto the light-emitting element 50. When the tracing ball 20 is rotating, the image sensor 60 obtains the moving distance and direction of the tracing ball 20 to calculate a displacement.

The light axial D of the projected light generated from the light-emitting element 50 passes through the spectroscope 31 one time or more than one time to locate the light axial D1 of the passing light in the image-obtaining area 21 of the tracing ball 20 in a horizontal direction. Thereby, the light beam is uniformly projected onto the image-obtaining area 21. Because the light axial D1 of the projected light and the light axial R of the obtaining-image overlap, are projected onto the spectroscope 31, and are projected onto the lens element 32 the uniform obtaining-image is generated. Thereby, the image sensor 60 can obtain the complete image to determine the moving distance and direction of the tracing ball 20 and calculate a displacement.

Figure 8:
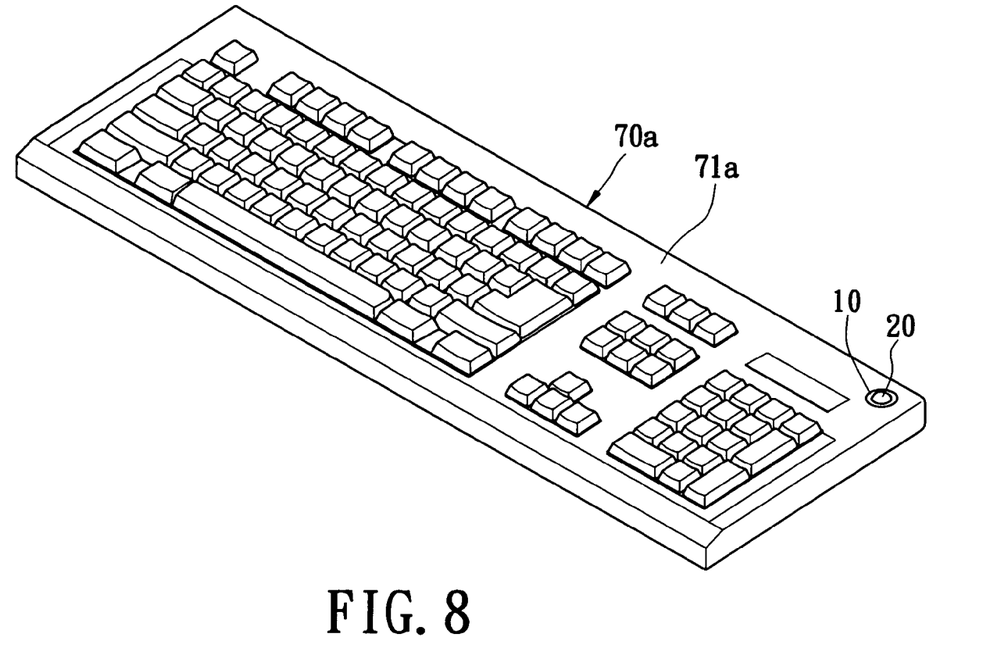
FIG. 8 is a schematic diagram of the present invention being applied to a keyboard.

As shown in FIG. 8, the present invention can be applied to an external shell 71a of the keyboard 70a of a desktop personal computer. The tracing ball 20 faces upwards and is electrically connected with a computer host (not shown in the figure). The user uses his or her fingers to rotate the tracing ball 20 to generate a complete displacement, and the computer host controls the cursor to move on the screen via the displacement. Of course, the present invention can be applied to any input device to control the cursor on the screen, such as a laptop or a portable communication device, etc. Alternatively, the shell body 10 can be implemented in different ways. For example, the surface of the external shell 71a of the keyboard 70a is indented inwards to form a concave receiving space (not shown in the figure) for receiving and positioning the tracing ball 20. Next, the other components (such as the circuit board, the light-emitting element, the optical base, and the image sensor) are assembled in the external shell 71a via the same assembling method to achieve the same function.

Figure 9:
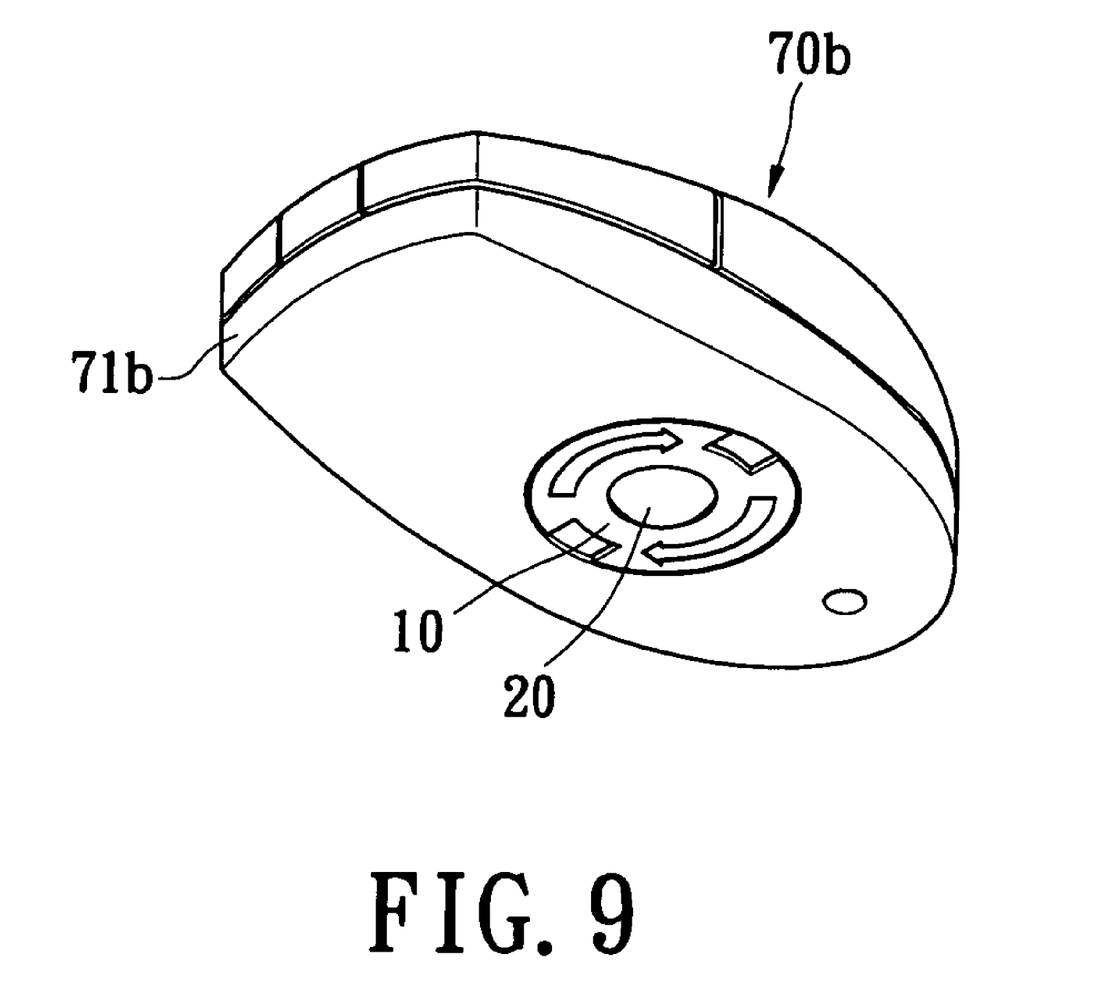
FIG. 9 is a schematic diagram of the present invention being applied to a mouse.

As shown in FIG. 9, the present invention can be applied to an external shell 71b of the mouse 70b. The tracing ball 20 faces downwards and is electrically connected with a computer host (not shown in the figure) via the mouse 70b. By utilizing the displacement, the cursor on the screen is controlled. When the present invention is being operated, the tracing ball 20 moves on a contacting surface (such as a table surface, a lens surface, or a glass surface). By contacting the tracing ball 20 with the contacting surface, the light of the light-emitting element (not shown in the figure) is projected on the spherical surface of the tracing ball 20, being not directly projected onto the contacting surface. The tracing ball 20 is used as a medium to contact the contacting surface so that the light source of the light-emitting element is not limited due to the type of the contacting surface. The problems of the prior art are overcome.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A multiple function optical image detecting structure, comprising:
   a shell body having a receiving space and a through hole that links through the receiving space;
   a tracing ball rotatably positioned in the receiving space of the shell body, wherein part of a spherical surface of the tracing ball extends outside of the shell body, and another part of the spherical surface of the tracing ball corresponds to the through hole;

an optical base located on one side of the through hole, wherein the optical base has an inclined spectroscope and a lens element located on one side of the spectroscope, and the spectroscope slantedly faces towards the through hole;

a circuit board located on one side of the optical base;

a light-emitting element electrically connected with the circuit board, wherein a light axial of the projected light generated from the light-emitting element faces towards the spectroscope of the optical base, the light axial of the projected light that has been reflected/transmitted by the spectroscope one time or more than one time is located on part of the spherical surface of the tracing ball, an spherical surface image of the tracing ball is reflected to the spectroscope, and a light axial of an obtaining-image and the light axial of the light projected by the spectroscope are overlapped; and an image sensor electrically connected with the circuit board, wherein the image sensor faces towards the lens element, the light axial of the obtaining-image is projected onto the lens element by the spectroscope;

thereby, the image sensor obtains the image on the lens element to determine the moving distance and direction of the tracing ball and calculate a displacement.

2. The multiple function optical image detecting structure as claimed in claim 1, wherein the shell body comprises:

an external shell having a receiving space, wherein the optical base is located in the external shell;

a supporting base having the through hole, wherein the supporting base is located in the external shell, the supporting base is installed with a plurality of rotating balls, and part of the ball is exposed outside of the supporting base to contact the spherical surface of the tracing ball; and a fastening cover combined with the external shell, wherein the fastening cover has an opening hole so that the spherical surface of the tracing ball passes through the opening hole and extends outside of the fastening cover.

3. The multiple function optical image detecting structure as claimed in claim 2, wherein the external shell and the supporting base are integrated into one piece so that the supporting base is combined with the receiving space of the external shell.

4. The multiple function optical image detecting structure as claimed in claim 2, wherein the external shell and the optical base are integrated into one piece so that the optical base is combined with the receiving space of the external shell.

5. The multiple function optical image detecting structure as claimed in claim 1, wherein the spectroscope has an external surface and an inner surface that are opposite to each other, and the lens element extends from the inner surface.

6. The multiple function optical image detecting structure as claimed in claim 5, wherein the external surface slantedly faces towards the through hole, the tracing ball and the light-emitting element, and the lens element is located in a direction that is far away from the tracing ball.

7. The multiple function optical image detecting structure as claimed in claim 5, wherein the inner surface slantedly faces towards the through hole and the tracing ball, and the lens element is located in a direction that faces the tracing ball.

8. The multiple function optical image detecting structure as claimed in claim 1, wherein the tracing ball, the lens element and the image sensor are installed in the same direction.

9. The multiple function optical image detecting structure as claimed in claim 1, wherein the tracing ball, the spectroscope and the light-emitting element are located in the same direction.

* * * * *